United States Patent
Deininger

[19]

[11] Patent Number: 6,047,545

[45] Date of Patent: Apr. 11, 2000

[54] HYDROSTATIC DRIVE SYSTEM

[75] Inventor: Horst Deininger, Alzenau, Germany

[73] Assignee: Linde Aktiengesellschaft, Germany

[21] Appl. No.: 09/159,536

[22] Filed: Sep. 23, 1998

[30] Foreign Application Priority Data

Sep. 24, 1997 [DE] Germany ............... 197 42 187

[51] Int. Cl.[7] ............................................. F16D 31/02
[52] U.S. Cl. ...................... 60/426; 60/452; 60/431; 91/516
[58] Field of Search ................ 91/511, 514, 516, 91/532; 60/420, 426, 452, 431

[56] References Cited

U.S. PATENT DOCUMENTS

| | | | |
|---|---|---|---|
| 4,966,066 | 10/1990 | Kauss et al. ............................... | 91/516 |
| 5,295,353 | 3/1994 | Ikari ............................................ | 60/431 |
| 5,315,828 | 5/1994 | Stellwagen et al. ..................... | 91/532 X |
| 5,471,908 | 12/1995 | Lech .......................................... | 91/516 |
| 5,647,211 | 7/1997 | Harber et al. ........................... | 91/532 X |
| 5,722,190 | 3/1998 | Arnold ..................................... | 91/516 X |

*Primary Examiner*—Hoang Nguyen
*Attorney, Agent, or Firm*—Webb Ziesenheim Logsdon Orkin & Hanson, P.C.

[57] ABSTRACT

A hydrostatic drive system is provided for a vehicle, in particular an industrial truck having a hydrostatic traction drive system (16), a hydraulic work system (20) and a hydraulic steering system (8). The drive system is compact and the energy utilization in the drive system is improved by providing a hydraulic pump (1) with an adjustable delivery volume working in an open circuit to supply the traction drive system (16), the hydraulic work system (20) and the steering system (8). In one configuration of the invention, there is at least one traction drive control valve (23) in the delivery line (5b) of the pump (1), whereby upstream of the traction drive control valve (23) in the delivery line (5b) of the pump (1) there is a priority valve (18) for the hydraulic work system (20), and upstream of the priority valve (18) of the hydraulic work system (20) there is a priority valve (6) for the steering system (8). In one embodiment of the invention, a feed line (11) of a feeder device (15) can be connected to the delivery line (5a) between the priority valve (6) of the hydraulic steering system (8) and the priority valve (18) of the hydraulic work system (20).

30 Claims, 1 Drawing Sheet

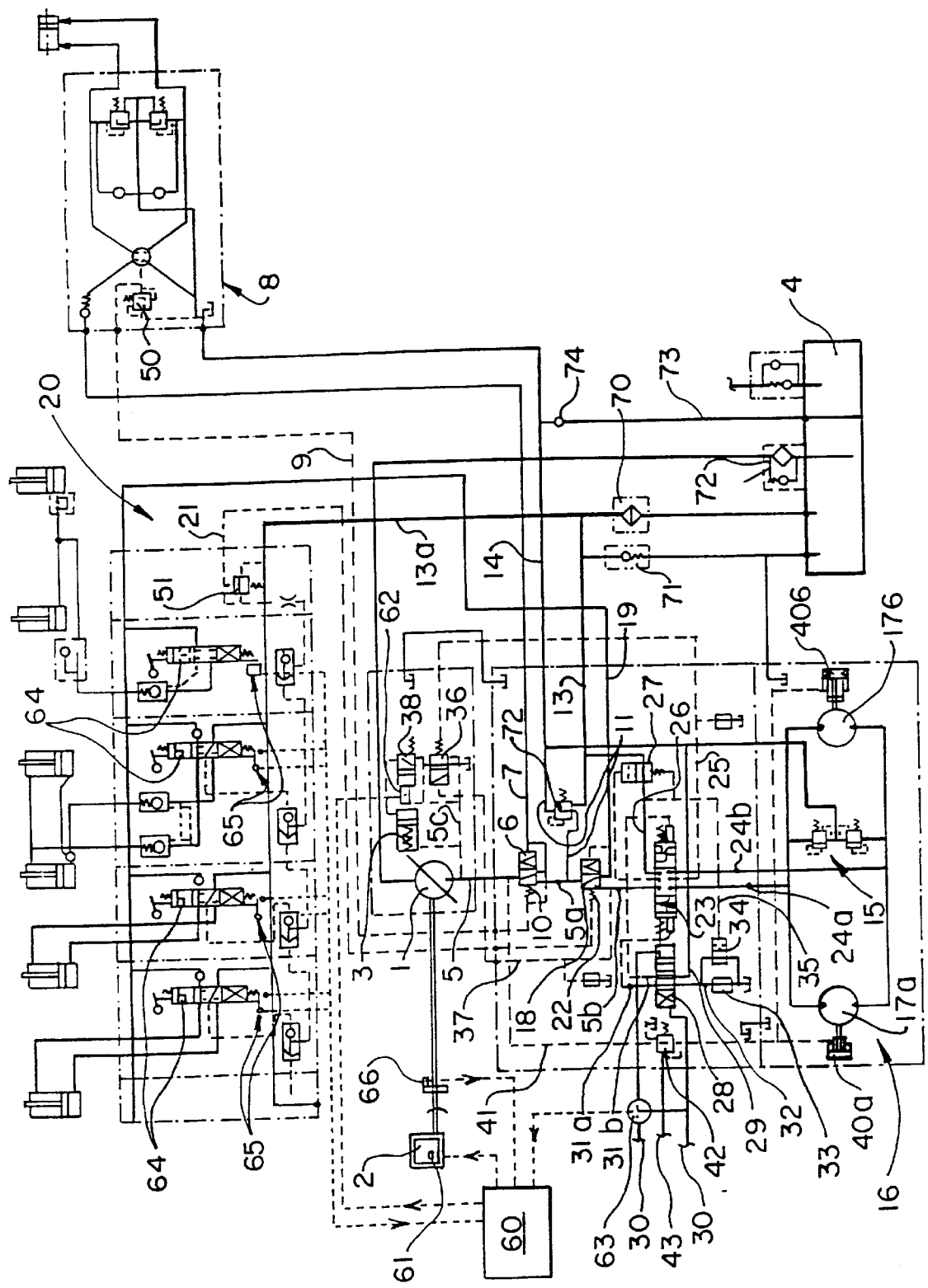

HYDROSTATIC DRIVE SYSTEM

BACKGROUND OF THE INVENTION

1. Field of the Invention

The invention relates generally to a hydrostatic drive system for a vehicle, such as an industrial truck, with a hydrostatic traction drive system, a hydraulic work system and a hydraulic steering system.

2. Description of the Prior Art

On known hydrostatic drive systems for vehicles, such as for a fork-lift truck or a wheel loader, the hydrostatic drive system generally has an adjustable-delivery pump and at least one drive motor connected to the pump in a closed circuit. To provide power to the hydraulic work system, there is an additional pump with a constant delivery volume which operates in an open circuit and sucks hydraulic fluid from a reservoir and, when the hydraulic work system is not in operation, returns the hydraulic fluid to the reservoir. The steering system is supplied with hydraulic fluid by an additional pump that also has a constant delivery volume and is operated in an open circuit.

On such drive systems, therefore, a plurality of pumps, for example three, are required to supply the hydraulic energy users with hydraulic fluid. The drive system therefore takes up a great deal of space. Additionally, all the pumps are continuously driven by a drive motor, although as a rule only one or two pumps are used simultaneously during the operation of the vehicle. That results in corresponding idle losses which in turn result in a low efficiency for the drive system. The continuous operation of all the pumps also results in unnecessary wear.

Therefore, it is an object of this invention to provide a hydrostatic drive system that is compact and in which the energy utilization in the drive system is improved.

SUMMARY OF THE INVENTION

The invention teaches that this object can be accomplished if there is one hydraulic pump with an adjustable delivery volume operating in an open circuit to supply the traction drive system, the hydraulic work system and the steering system of the vehicle. The teaching of the invention is therefore to provide, instead of a plurality of pumps, a single pump that is operated in the open circuit and that is used for the simultaneous supply of the traction drive system, the hydraulic work system and the steering system. The unit is compact as a result of the elimination of the additional pumps. The use of only one pump with an adjustable delivery volume also makes it possible to adjust the delivery current or output of the pump to meet the delivery requirements of the users in corresponding operating situations, which results in an improved utilization of energy.

In one configuration of the invention, the hydraulic pump is connected to a delivery line in which there is at least one traction drive control valve. Upstream of the traction drive control valve in the delivery line of the pump, there is a priority valve for the hydraulic work system and upstream of the priority valve of the hydraulic work system there is a priority valve for the steering system. In the delivery line of the pump, therefore, first there is the priority valve of the steering system, the priority valve of the hydraulic work system and finally the traction drive control valve. Top priority is therefore given to the supply of hydraulic fluid to the steering system. The steering system, which is a safety-relevant component of a vehicle, is therefore supplied with sufficient hydraulic fluid under all operating conditions so that the vehicle can be steered at all times. After the steering system, the hydraulic work system is supplied with hydraulic fluid, thereby guaranteeing that under conditions in which the traction drive system and the hydraulic work system are operated simultaneously, the hydraulic work system will be supplied with hydraulic fluid first. The hydraulic fluid not required by the hydraulic work system will be available to supply the traction drive system. As a result of the priority supply of the steering system and the hydraulic work system, it is thereby possible to use a pump, the delivery volume of which is only slightly greater than the delivery volume of a pump of the prior art used to supply the traction drive system.

On a drive system with a feeding device for the hydrostatic traction drive system, one configuration of the invention provides that a feed line of the feeder device is connected to the delivery line between the priority valve of the hydraulic steering system and the priority valve of the hydraulic work system. The feeder device guarantees that any oil that leaks out of the hydrostatic traction drive system can be made up. Thus, there will always be sufficient hydraulic fluid available. The traction drive system is thereby protected from cavitation and prevented from running dry, because such conditions can lead to major damage to the traction drive system. As a result of the location of the feed line downstream of the priority valve of the steering system, the feeding device is supplied with second priority. The hydraulic work system is thereby pressurized with third priority after the steering system and the feeding device. The invention thereby guarantees that any lack of hydraulic fluid in the traction drive system will be made up, and cavitation in the drive motors is prevented.

In this case, it is particularly advantageous if the steering system is realized in the form of a load-sensing steering system. The priority valve for the steering system can be pressurized in the direction of a switching position that connects the delivery line with the inlet line of the steering system by a spring and the load pressure of the steering system and can be pressurized in the direction of a switching position that can bring the delivery line into communication with the inlet line of the hydraulic steering system and with the delivery line leading to the priority valve of the hydraulic work system by the pressure in the inlet line of the steering system. A steering system realized in the form of a load-sensing steering system does not require a constant delivery current. When the steering system is actuated, the steering system extracts hydraulic fluid only out of the feed line of the pump. Such a priority valve guarantees that the inlet line of the steering system will be pressurized with hydraulic fluid under all operating conditions. Only when the pressure level defined by the spring or when the steering system is actuated by the spring and the load pressure of the steering system is exceeded are the users located downstream of the priority valve, i.e. the feeder device, the hydraulic work system and the traction drive system, supplied with the hydraulic fluid not required by the steering system.

The priority valve for the hydraulic work system can with particular advantage be pressurized in the direction of a switching position connecting the delivery line with the inlet line of the hydraulic work system by a spring and the load pressure of the hydraulic work system, and in the direction of a switching position that can bring the delivery line into communication with the inlet line of the hydraulic work system and with the delivery line leading to the traction drive control valve by the pressure in the inlet line of the hydraulic work system. The priority valve of the hydraulic work system therefore guarantees in a simple manner that the hydraulic work system will be supplied with hydraulic fluid before the traction drive system.

It is particularly appropriate if there is a pressure reducing valve in the feed line. The pressure reducing valve can reduce the pressure in the feed line to conventional values in a simple manner.

With particular advantage, the feed line can be connected downstream of the pressure reducing valve to a return line of the steering system and with an outlet line leading to the reservoir. As a result of the connection of the feed line with the return line, sufficient hydraulic fluid is present in the feed line. In addition, the return fluid from the steering system does not flow into the reservoir unused, but is used to supply the feeder device. That results in an improved utilization of energy in the drive system. As a result of the connection of the pressure reducing valve to the reservoir, it is possible to limit the pressure in the feed line to a definable maximum value, whereby when the specified pressure level has been reached, the feed line is connected to the reservoir. Hydraulic fluid not required by the feeder device can therefore flow from the return line of the steering system to the reservoir.

In one embodiment of the invention, the traction drive control valve is realized in the form of a throttling, spring-centered directional control valve with a closed middle position that, depending on its flow status, opens an inlet orifice and an outlet orifice, whereby the traction drive control valve is connected to the delivery line and an outlet line that is connected to the reservoir, and to the delivery lines of the traction drive system as well as a load pressure signal line. Such a traction drive control valve makes it possible, in a simple manner, to define the speed and direction of travel of the vehicle, and to control the braking process.

It is particularly advantageous if, in the outlet line from the traction drive control valve, there is a flow regulator which, in a first switching position, interrupts the connection between the outlet line of the directional control valve and the reservoir, and in a second switching position connects the outlet line with a reservoir, whereby the flow regulator can be pressurized toward the first switching position by the pressure in the delivery line upstream of the traction drive control valve, and toward the second switching position by the force of a spring and the pressure in the outlet line downstream of the traction drive control valve. The flow regulator regulates the flow of hydraulic fluid flowing back from the traction drive system to the reservoir. The opening cross section of the outlet side of the traction drive control valve thereby forms the measurement throttle of the flow regulator. Under operating conditions in which the flow of hydraulic fluid in the outlet side of the traction drive system exceeds the flow of hydraulic fluid set at the measurement throttle of the traction drive control valve, the flow regulator is pressurized toward the first switching position and thus builds up a braking pressure. During braking, therefore, the vehicle retains the speed set on the traction drive control valve. In this case, it is particularly appropriate if the flow regulator is integrated into the spool valve of the traction drive control valve. Consequently, the traction drive control valve and the flow regulator occupy little space.

The inlet orifice and the outlet orifice of the traction drive control valve are preferably substantially the same size. It thereby becomes possible, in a simple manner, in any switching position of the traction drive control valve, to ensure that the quantity of hydraulic fluid flowing to the traction drive motors is equal to the quantity of hydraulic fluid flowing out of the traction drive motors, and thus the vehicle can be operated at the desired speed set on the traction drive control valve.

It is particularly advantageous if a precision control range is provided on the traction drive control valve, in which the outlet orifice is smaller than the inlet orifice of the traction drive control valve in response to a small modulation of the traction drive control valve. As a result, there is an initial pressure in the traction drive system, which means that a precise control of the vehicle becomes possible at low speeds of travel.

To minimize the losses at higher speeds of travel, the invention teaches that in the range of the maximum deflection of the traction drive control valve, the outlet orifice of the traction drive control valve can be larger than the inlet orifice of the traction drive control valve.

In one embodiment, the traction drive control valve can be actuated hydraulically, whereby downstream of the pressure reducing valve, a control pressure line branches off from the feed line and can be placed in communication with the traction drive control valve. In this case, the control surfaces of the traction drive control valve are pressurized by a control pressure, whereby the hydraulic fluid required for the purpose is taken from the feed device. The pump is therefore also used to supply the control circuit of the traction drive control valve, whereupon it becomes possible to actuate the traction drive control valve with little added effort.

The invention teaches that it is particularly advantageous if, in the control pressure line, there is a control valve that can be actuated by means of an actuator element and is effectively connected to the traction drive control valve for feedback on the deflection of the traction drive control valve. The control valve pressurizes the control surfaces of the traction drive control valve with control pressure. As a result of the feedback on the deflection of the traction drive control valve, when the position set on the actuator element is reached, the traction drive control valve is held in the corresponding position. It thereby becomes possible, in a simple manner, to convert a desired deflection of the actuator element into a corresponding position of the traction drive control valve. Because the traction drive control valve is piloted by means of the control valve, the actuator element or elements can also be isolated from the traction drive control valve, as a result of which the flow vibrations that are generated in the traction drive control valve are not transmitted to the actuator elements. In addition, as a result of the piloting, the actuator elements are isolated from the friction forces and the flow forces in the traction drive control valve, which results in more reliable operation of the traction drive control valve.

In one refinement of the invention, a flow control valve is located in an outlet line of the control valve. It thereby becomes possible to control the current of hydraulic fluid flowing from the control valve to the reservoir. The current of hydraulic fluid flowing to the reservoir determines the speed of actuation of the traction drive control valve, which also means that the control valve can be used to achieve a desired deceleration.

For this purpose, it is particularly advantageous if, in the outlet line of the control valve, there is a bypass valve for the flow control valve that can be pressurized by the pressure in the outlet line of the traction drive control valve upstream of the flow regulator in the direction of a closed position, and by the force of a spring in the direction of an open position. It is thereby guaranteed that the deceleration will be performed only if a corresponding braking pressure has built up at the flow regulator and thus a braking action can be initiated.

It is particularly appropriate if the traction drive control valve and the control valve are realized in the form of a rotary spool valve. A control valve realized in the form of a rotary spool valve can be deflected in a simple manner by means of actuator elements. The feedback to the control valve on the deflection of the traction drive control valve can also be achieved in a simple manner.

In one refinement of the invention, on the traction drive system there is a parking brake device that has a parking brake valve and a brake line leading to the parking brake device. The parking brake valve can be actuated by means of an actuator element and the brake line is connected to the delivery line upstream of the priority valve for the steering system. The pressure in the delivery line of the pump upstream of the priority valve of the steering system is thereby available at the parking brake valve, as a result of which the parking brake device, which can be a stored energy parking brake, for example, can be released at any time.

In this case it is particularly appropriate if the parking brake valve is realized in the form of a pressure reducing valve. It thereby becomes possible in a simple manner to limit the pressure applied to release the parking brake device.

In one refinement of the invention, there is a demand flow regulator that is effectively connected to an adjustment device of the pump and that can be pressurized by a load pressure available downstream of the traction drive control valve and by a spring in the direction of an increase in the delivery current, and in the direction of a reduction in the delivery current by the pressure in the delivery line upstream of the traction drive control valve. The delivery flow of the pump can thereby be adjusted under the appropriate operating conditions to the delivery current demand of the user, as a result of which there is a high energy efficiency of the drive system, and idle losses are reduced.

It is particularly advantageous if the load pressure signal line of the hydraulic work system has a pressure relief valve that is set to the maximum pressure of the hydraulic work system. The pressure in the circuit of the hydraulic work system can thereby be limited in a simple manner.

It is particularly advantageous if, in the load pressure signal line of the steering system, there is a pressure relief valve that is set to the maximum allowable pressure of the steering system. The pressure in the steering circuit can thereby also be limited if, when the pressure relief valve responds, the pressure in the load pressure signal line is limited, and thus the priority valve is pressurized into a switching position that supplies the additional users with hydraulic fluid.

In one configuration of the invention, there is an electronic control device that is effectively connected to a speed control device for the prime mover used to drive the pump, and the speed control device of the prime mover is controlled as a function of the setpoints of the traction drive system and/or of the hydraulic work system. In the event of an actuation of the hydraulic work system or of the vehicle traction drive system, the speed of the prime mover of the vehicle and thus the quantity of hydraulic fluid delivered by the pump can also be increased as required.

For this purpose, it is particularly advantageous if, on directional control valves of the hydraulic work system, there are sensor devices that measure the deflection of the directional control valves and/or on the actuator element of the hydraulic traction drive system there is a sensor device to define a setpoint for the electronic control device. The control device can thus modify the speed of the prime mover as a function of the setpoint signals of the sensor devices.

It is particularly advantageous if the electronic control device has a reducing regulator for the speed of the prime mover, whereby there is a sensor device that measures the actual speed of the prime mover. It is thereby possible to depressurize the prime mover in the event of an overload, e.g. caused by a reduction of the delivery of the pump, and thus to prevent a stalling of the prime mover.

Furthermore, it is particularly advantageous if there is a valve that influences the adjustment device of the pump, and which can be pressurized in the direction of a reduction of the delivery current by the pressure in the delivery line upstream of the priority valve of the steering system, and in the opposite direction by the force of a spring, whereby the spring is set to the maximum operating pressure of the drive system. It thereby becomes possible to achieve a pressure cutoff by reducing the delivery of the pump when the maximum pressure is exceeded. This characteristic eliminates the need for a pressure relief valve which, when the maximum pressure is exceeded, creates a connection between the delivery line and the reservoir and thus results in losses.

It is appropriate if the demand flow regulator or the valve which influences the adjustment device of the pump can be pressurized in the direction of a reduction of the delivery current by the electronic control system. The delivery of the pump can thereby be reduced in a simple manner when there is a reduction in the speed of the drive motor.

For that purpose, it is particularly advantageous if the demand flow regulator or the valve has a proportional magnet that is connected to the electronic control system. It thereby becomes possible in a simple manner to convert a signal into a force for the actuation of the demand flow regulator or of the valve, and to adjust the pump in the direction of a reduction of the delivery flow.

BRIEF DESCRIPTION OF THE DRAWING

Additional advantages of the invention are explained in greater detail below with reference to the exemplary embodiment illustrated in the accompanying schematic drawing figure. The figure shows a circuit diagram of a drive system of the invention.

DESCRIPTION OF THE PREFERRED EMBODIMENTS

For purposes of the description hereinafter, the terms "right", "left", "top", "bottom", "front", "rear" and derivations thereof shall relate to the invention as it is oriented in the drawing figure. However, it is to be understood that the invention may assume various alternative variations and step sequences, except where specified to the contrary. It is also to be understood that the specific devices illustrated in the attached drawing, and described in the following specification, are simply exemplary embodiments of the invention. Hence, specific physical characteristics related to the embodiments described herein are not to be considered as limiting.

The drive system illustrated in the drawing figure has a pump 1 which is driven by a prime mover 2, such as an internal combustion engine. The delivery volume of the pump 1 is set by a spring-loaded piston-cylinder system 3 that acts in conventional manner on an adjustment device of the pump 1. The pump 1 works in an open circuit and sucks hydraulic fluid out of a reservoir 4 via a suction filter 72 and feeds into a delivery line 5. In this case, the reservoir 4 is thereby preferably under a certain initial pressure.

In the delivery line 5, downstream of the pump 1, there is a priority valve 6 which, in the illustrated position, connects the delivery line 5 with the inlet line 7 of a steering system 8, which is preferably a load sensing steering system. In the illustrated switching position, the delivery current of the pump 1 is fed exclusively to the steering system 8. The priority valve 6 for the steering system can be pressurized in the direction of this switching position by a load pressure of the steering system 8 conveyed in a load pressure signal line 9 and by the force of a spring 10. The priority valve 6 can be pressurized in the direction of the switching position illustrated on the right in the figure by the pressure in the inlet line 7 of the steering system 8. As soon as the pressure difference between the inlet line 7 and the load pressure signal line 9 has reached a level sufficient to overcome the force of the spring 10, the priority valve 6 is pressurized into the switching position illustrated on the right in the figure, in which the additional users are supplied with hydraulic fluid. The hydraulic fluid not needed by the steering system 8 thus flows into a delivery line portion 5a of the delivery line 5 which is located downstream of the priority valve 6. In the load pressure signal line 9 of the steering system 8 there is a pressure relief valve 50 which is set to the maximum allowable pressure in the steering system 8.

From the delivery line portion 5a, a feed line 11 branches off, and in this feed line 11 there is a pressure reducing valve 12. The pressure reducing valve 12 limits the pressure in the feed line 11 to a set, specified value. Connected to the feed line 11, downstream of the pressure reducing valve 12, there is a return line 14 from the steering system 8. The return line 14 from the steering system 8 is also connected to a line 73 to the reservoir 4. In the line 73 there is a one-way valve 74 that opens in the direction of the return line 14 and thus to the feed line 11. The pressure reducing valve 12 can also be connected with an outlet line 13 that leads to the reservoir 4. If the pressure in the feed line 11 downstream of the pressure reducing valve 12 exceeds a set or specified value, the pressure reducing valve 12 opens the connection of the feed line 11 located downstream of the pressure reducing valve 12 to the outlet line 13, as a result of which the pressure in the feed line 11 is limited to an upper value. In the outlet line 13 leading to the reservoir 4, there is a cooler 70 and a bypass valve 71 to the cooler 70.

The feed line 11 leads to a feeder device 15 of the traction drive system 16, the feeder device 15 formed by combined pressure relief and anti-cavitation valves. The traction drive system 16 consists, for example, of two traction drive motors 17a, 17b, whereby the two sides of the traction drive system 16 can be connected to one another by means of the feeder device 15. The feeder device 15 protects the drive motors 17a, 17b against overload by means of the pressure relief valves, and by means of the anti-cavitation valves makes it possible to supply the drive motors 17a, 17b with fluid from the feed line 11. In this case, the drive motors 17a, 17b are realized with a constant delivery volume, although they can also be realized with adjustable delivery volumes. It is also possible to have any desired number of drive motors.

In the delivery line portion 5a, downstream of the feed line 11, there is a priority valve 18 which, in the switching position illustrated in the accompanying drawing, connects the delivery line portion 5a with the inlet line 19 of a hydraulic work system 20. In the switching position illustrated on the right in the figure, the delivery line portion 5a can be connected to the inlet line 19 and a delivery line portion 5b downstream of the priority valve 18. The priority valve 18 can be pressurized in the direction of the illustrated switching position by the pressure in a load pressure signal line 21 of the hydraulic work system 20 and the force of a spring 22. The priority valve 18 can be pressurized in the direction of the other switching position by the pressure in the inlet line 19. The delivery current of the pump 1 in the delivery line portion 5a is thus divided between the inlet line 19 and the delivery line portion 5b as soon as the pressure difference between the pressure in the inlet line 19 and the load pressure signal line 21 is sufficient to overcome the force of the spring 22. The hydraulic work system 20 has a directional control valve 64 for each user, such as the lifting cylinder and the tilting cylinder of a lifting mast of an industrial truck and any other users that may be connected to the system. The highest of the load pressures of the consumers connected downstream of the directional control valve 64 is delivered by means of a system of shuttle valves to the load pressure signal line 21. In the load pressure signal line 21 there is a pressure relief valve 51 that is set to the maximum allowable pressure in the hydraulic work system 20. An outlet line 13a of the hydraulic work system 20 is connected to the outlet line 13 leading from the pressure reducing valve 12 to the reservoir 4.

In the delivery line portion 5b, downstream of the priority valve 18, there is a traction drive control valve 23. Connected to the traction drive control valve 23 are traction delivery lines 24a, 24b which lead to the connections of the traction drive motors 17a, 17b. Also connected to the traction drive control valve 23 is a load pressure signal line 25 which measures the load pressure of the traction drive motors 17a, 17b downstream of the throttle point of the traction drive control valve 23. The traction drive control valve 23 can also be connected to a return line 26 that leads to the outlet line 13. Located in the return line 26 is a flow regulator 27 which can be pressurized in the direction of an open position by the pressure in the outflow or return line 26 and the force of a spring, and in the direction of a closed position by the pressure in the delivery lines 24b and 24a, and thus the pressure upstream of the throttle point of the traction drive control valve 23 in the return line 26.

In the illustrated middle position of the traction drive control valve 23, the connections are closed, as a result of which the traction drive system 16 is blocked. In the switching positions illustrated on the left and the right in the figure, the delivery line portion 5b is connected with the delivery lines 24a and 24b and the return line 26 with the delivery lines 24b and 24a, respectively, as a result of which the traction drive motors 17a, 17b can be operated in both directions.

To actuate the traction drive control valve 23 there is a control valve 28 that is connected to a control pressure line 29 that branches off from the feed line 11. The valve body of the control valve 28 can be actuated by means of an actuator element 30, for example by a system of two pedals. When there is a deflection of the actuator element, a control pressure is introduced in the control pressure branch lines 31a and 31b, which is available at the control surfaces of the traction drive control valve 23, and thus deflects the traction drive control valve correspondingly. To provide feedback from the deflection of the traction drive control valve 23, for example, the valve housing of the control valve 28 is effectively connected to the traction drive control valve 23. As a result, in the event of the deflection of the traction drive control valve 23 set by means of the actuator element 30 on the control valve 28, the control edges of the control valve 28 are closed and the deflection of the traction drive control valve 23 is limited. The illustrated switching position of the control valve 28 represents a floating position, so that the traction drive control valve 23 is deflected by the force of the springs into the middle position.

Located in an outlet line 32 from the control valve 28 there is a flow control valve 33 that is preferably realized in the form of a quantitative control valve and controls the speed of movement of the traction drive control valve 23 and thus governs the deceleration of the traction drive system 16. Connected to the flow control valve 33 is a bypass valve 34 to the outlet line 32, which has an open position and a closed position. The bypass valve 34 is pressurized in the direction of the open position by the force of a spring. A control surface of the bypass valve 34 that acts in the direction of the closed position is connected by means of a line 35 to the return line 26 upstream of the flow regulator 27.

The piloting of the traction drive control valve 23 by the mechanically actuated control valve 28 means that in the event of damage to the control pressure lines 31a, 31b or the control pressure line 29, and thus a drop in the pressure on the control surfaces of the traction drive control valve 23, the traction drive control valve 23 is deflected by the force of the return springs into the middle position and is held there. The feed of hydraulic fluid to the traction drive motors 17a, 17b is therefore interrupted on both sides. Hydraulic fluid can, however, flow through the anti-cavitation valves of the feeder device 15 to the suction side of the traction drive motors 17a, 17b, as a result of which cavitation and thus damage to the traction drive motors 17a, 17b can be prevented.

To pressurize the piston-cylinder system 3 of the adjustment device of the pump 1, there is a demand flow regulator 36 connected to the delivery line 5 by means of delivery branch line 5c. The demand flow regulator 36 can be pressurized in the direction of a reduction in the delivery of the pump 1 by the pressure in a control pressure line 37, in which the pressure is available downstream of the priority valve 18 and thus in the delivery line portion 5b. The demand flow regulator 36 can be pressurized in the direction of an increase in the delivery flow of the pump by the load pressure of the traction drive system 16 in the load pressure signal line 25 and by a spring. An additional valve 38 connected to the delivery branch line 5c downstream of the demand flow regulator 36 can be pressurized in the direction of a reduction in the delivery flow of the pump 1 by the pressure in the delivery branch line 5c. The valve 38 can be pressurized in the direction of an increase in the delivery of the pump 1 by the force of a spring, and can be set, for example, to a value that corresponds to the maximum pressure of the drive system 16. When the maximum pressure in the delivery line 5 is exceeded, the pump 1 is thereby pressurized in the direction of a reduction in the delivery flow, as a result of which the pressure can be cut off.

On each of the traction drive motors 17a, 17b there is a parking brake device 40a and 40b, respectively, which can be released by means of a pressure available in a brake line 41. The brake line 41 is connected to the delivery line 5 upstream of the priority valve 6 and has a parking brake valve 42 which can be actuated by means of a pedal 43, for example. The parking brake valve 42 is preferably realized in the form of a pressure reducing valve, by means of which the pressure available in the brake line 41 for releasing the parking brake device 40a, 40b can be limited.

There is also an electronic control device 60, the output side of which is effectively connected to a speed control device 61 of the prime mover 2 and the valve 38. For this purpose, the valve 38 has a proportional magnet 62, by means of which the valve 38 can be switched in the direction of a reduction in the delivery of the pump 1. On the input side, the electronic control device 60 is connected with a sensor device 63, such as a potentiometer, that measures the deflection of the actuator element 30. Also provided on the directional control valves 64 of the hydraulic work system 20 are sensor devices 65 that measure the deflection of the directional control valves 64. There is also a sensor device 66 that measures the current speed of the prime mover 2, and can be located, for example, on the output shaft of the prime mover 2.

The drive system claimed by the invention functions as follows:

In the starting position, the demand flow regulator 36, the valve 38, the priority valves 6 and 18 and the traction drive control valve 23 are in the illustrated positions as a result of the force of the corresponding springs. The pump 1 thereby delivers hydraulic fluid into the delivery line 5, as a result of which the pressure in the delivery line 5 increases. As soon as the pressure in the delivery line 5 and thus in the inlet line 7 of the steering system 8 is sufficient to overcome the force of the spring 10 on the priority valve 6, the priority valve 6 is pressurized into the switching position illustrated on the right in the figure, as a result of which the hydraulic fluid flows into the delivery line portion 5a and the feed line 11. The pressure reducing valve 12 limits the pressure in the feed line 11 to the specified value, as a result of which the hydraulic fluid reaches the feeder device 15. If the pressure in the delivery line portion 5a and thus in the inlet line 19 exceeds the value of the spring 22 of the priority valve 18, the priority valve 18 is deflected into the switching position illustrated on the right in the figure, as a result of which the delivery line portion 5b continues to be pressurized with hydraulic fluid. The pressure in the control pressure line 37 thereby increases, as a result of which, as soon as the pressure in the control pressure line 37 exceeds the value of the control spring of the valve 38, the demand flow regulator 36 is deflected into the switching position illustrated on the left in the figure. The piston chamber of the piston-cylinder system 3 is thereby pressurized by the pressure in the delivery line 5 and thus the adjustment device of the pump 1 is deflected into a position that reduces the delivery.

If no users are actuated, the drive system is in a sort of stand-by status, in which the pressure in the delivery line 5 is set to a pressure level that corresponds to the force of the spring of the piston-cylinder system 3. Thus, there is sufficient hydraulic fluid available in the brake line 41 of the parking brake device 40a, 40b and of the feed line 11.

If, beginning with this situation, the steering system 8 is actuated, the equilibrium at the priority valve 6 is disrupted, as a result of which the priority valve 6 is pressurized into the switching position illustrated on the left in the figure, and the steering system 8 is supplied with hydraulic fluid with first priority. Consequently, the pressure in the delivery line portions 5a and 5b, and thus in the control pressure line 37, is also influenced, as a result of which the equilibrium at the demand flow regulator 36 is also disrupted, and the pump 1 is actuated in the direction of an increase in the delivery. As soon as the pressure difference at the priority valve 6, which is formed by the difference between the pressure in the inlet line 7 and the load pressure of the steering system 8 in the load pressure signal line 9, exceeds the force of the spring 10, the delivery line portion 5a is pressurized with hydraulic fluid. The pressure in the delivery line portions 5a, 5b and in the control pressure line 37 then increases again, as a result of which the demand flow regulator 36 is pressurized into a switching position that reduces the delivery volume of the pump 1. The pump 1 therefore delivers the instantaneous demand of the steering system 8. The hydraulic fluid flowing back from the steering system 8 in the return line 14 is delivered to the feed line 11, as a result of which a drop in the pressure in the feed line 11 is prevented and it becomes possible to deliver a sufficient supply of hydraulic fluid to the feeder device 15. The pressure reducing valve 12 limits the pressure in the feed line 11 to a maximum value, whereby when this pressure is exceeded, the feed line 11 is connected with the outlet line 13 and the excess hydraulic fluid in the return line 14 can flow to the reservoir 4. The line 73 and the one-way valve 74 guarantee that in an emergency, the steering system 8 can extract hydraulic fluid from the reservoir.

If only one or more directional control valves 64 of the hydraulic work system 20 are actuated, the actions described above occur in the sequence indicated, as a result of which the pump 1 is switched to meet the instantaneous demand of the hydraulic work system 20. Additionally, however, the deflection of the directional control valves 64 is also detected by the sensor devices 65, as a result of which the electronic control device 60 acts on the speed control device 61 and thus the speed of the prime mover 2 is increased. Consequently a sufficient supply of hydraulic fluid to the hydraulic work system 20 becomes possible.

If only the steering system 8 or the operating hydraulic system 20 is actuated, the pump 1 therefore operates in the load-sensing mode, in which only if there is a decrease in the speed, i.e. if the actual speed of the prime mover 2 measured by the sensor device 66 drops below the setpoint speed set on the speed control element 61, does the electronic control device 60 exert an influence on the setting of the pump 1. The electronic control device 60 thereby controls the setting of the valve 38 by means of the proportional magnet 62, as a result of which the valve 38 is deflected into the position illustrated on the left in the figure and thus the delivery of the pump 1 is reduced.

In the event of an actuation of the actuator element 30, the control valve 28 is deflected into the corresponding switching position, as a result of which the control pressure line 29 is connected with the control pressure branch lines 31*a* and 31*b* respectively and thus the traction drive control valve 23 is switched accordingly. As a result of the mechanical coupling of the traction drive control valve 23 and the control valve 28, the traction drive control valve 23 can be deflected as a function of the direction and speed of travel specified by the actuator element 30.

Hydraulic fluid therefore flows via the delivery line portion 5*b*, as a function of the switching position of the traction drive control valve 23, to the delivery line 24*a* or 24*b* that forms the inlet side. The respective other delivery line 24*b* or 24*a* that represents the outlet side is connected to the return line 26. The flow regulator 27 is in the open position, so that the hydraulic fluid in the return line 26 flows to the outlet line 13 and thus to the reservoir 4.

The load pressure of the traction drive motors 17*a*, 17*b* is measured on the load pressure signal line 25 and is transmitted to the spring side of the demand flow regulator 36. The equilibrium at the valve 38 is thus disrupted, as a result of which the valve 38 is deflected to the left in the figure, and thus swivels the pump and delivers the demand flow to the traction drive system 16. The deflection of the actuator element 30 is detected by means of the sensor device 63, and the speed of the prime mover 2 is increased by the electronic control device 60. If there is a drop in the speed of the prime mover 2 during the acceleration of the vehicle, the delivery of the pump 1 can be reduced by means of the proportional magnet 62 located on the valve 38 by the electronic control device 60, so that the load is taken off the prime mover 2. The acceleration of the vehicle is therefore determined by the reducing regulator in the electronic control device 60.

When the vehicle is traveling downhill, the traction drive motors 17*a*, 17*b* act as pumps and suck hydraulic fluid out of the delivery line portions 5a, 5b. The pressure in the delivery line 24*a* or 24*b* forming the inlet side thereby decreases. The traction drive motors 17*a*, 17*b* attempt to deliver a larger quantity of hydraulic fluid through the outlet-side throttle point of the traction drive control valve 23 than corresponds to the setpoint speed of the vehicle set at the outlet-side throttle point. The outlet-side pressure upstream of the throttle point of the traction drive control valve 23 thereby increases, whereupon the flow regulator 27 is pressurized in the direction of the closed position. A braking pressure is thus built up in the return line 26 that decelerates the vehicle and keeps it moving at the specified speed of travel. As a result of the pressure drop in the inlet-side delivery line 24*a* or 24*b* and thus in the control pressure line 37, the pump 1 is thereby rotated by the demand flow regulator 36 in the direction of an increase in the delivery quantity. The electronic control device 60 keeps the prime mover 2 at a corresponding speed, so that the pump 1 delivers sufficient hydraulic fluid. Sufficient hydraulic medium is therefore available on the suction side of the traction drive motors 17*a*, 17*b*.

During a deceleration process, i.e. during the retraction of the deflection of the actuator element 30, the inlet-side and outlet-side throttle point on the traction drive control valve 23 is reduced by the movement of the traction drive control valve 23 into the middle position. As a result of the kinetic energy of the vehicle, however, the traction drive motors 17*a*, 17*b* are attempting to deliver a larger quantity of hydraulic fluid into the return side than corresponds to the quantity of hydraulic fluid set on the outlet-side throttle orifice of the traction drive control valve. The processes described above therefore take place, as a result of which the flow regulator 27 builds up a braking pressure. To make possible a defined braking process, i.e. a smooth deceleration, the quantitative flow control valve 33 is located in the outlet line of the control valve 28, which valve 33 controls the return movement of the traction drive control valve 23 into the middle position and thus specifies a braking deceleration. The deceleration becomes effective as soon as the bypass valve 34 is pressurized by the braking pressure build up in the line 35 into the closed position. The braking deceleration thus becomes active only when the braking action is initiated by the flow regulator 27. First the speed of the vehicle is adjusted to the speed specified by the outlet-side throttle point of the traction drive control valve 23 and is then decelerated in a defined manner. During a deceleration process, the speed of the prime mover 2 is reduced by the electronic control device 60.

When there is a simultaneous actuation of the traction drive system 16 and of the steering system 8, as a result of the load pressure of the steering system 8, the equilibrium on the priority valve 6 is disrupted, so that the steering system 8 is provided with a priority supply of hydraulic fluid. The hydraulic fluid not needed by the steering system 8 flows to the delivery line portion 5*a* and thus to the traction drive control valve 23. As a result of the pressure drop which then occurs in the control pressure line 37, the adjustment device of the pump 1 is set in the sense of an increase in the delivery volume, so that the pump 1 also delivers the amount demanded by the steering system, if and to the extent that the delivery volume of the pump 1 can be increased. The magnitude of the delivery volume can be defined so that at the maximum speed of travel, there is a reserve pivoting angle and thus an additional delivery current for the steering system 8 as well as for the feeder device 15. If the delivery flow demanded by the traction drive system 16 and the steering system 8 exceeds the delivery flow that can be supplied by the pump 1, the steering system 8 is supplied with first priority and the feeder device 15 with second priority. The hydraulic fluid not required by these users is available to the traction drive system 16, so that the forward propulsion of the vehicle is reduced. The traction drive system 16 is thereby in a free-running condition, in which the vehicle continues to roll as a result of its kinetic energy. The suction side of the traction drive motors 17a, 17b is supplied by the anti-cavitation valves of the feeder device 15 with hydraulic fluid, thereby preventing cavitation on the inlet side of the traction drive motors 17a, 17b. The vehicle reduces its speed of travel by coasting until the speed of travel has reached the speed that corresponds to the delivery current of the pump available for propulsion.

In the event of the simultaneous operation of the hydraulic work system 20 and of the traction drive system 16, essentially the sequences described above take place and the pump 1 also delivers the quantity demanded by the hydraulic work system 20, if and to the extent that the delivery volume of the pump 1 can be increased. The electronic control device 60 forms a total delivery demand of the pump 1 from the setpoints provided by the sensor devices 65 and 63 for the speed of movement of the users of the hydraulic work system 20 and of the traction drive system 16. The deflection of the directional control valves 64 and of the actuator element 30, which are measured by the sensor devices 65, 63, hereby each represent a defined demand for hydraulic fluid. A total delivery demand can thereby be calculated by addition in the electronic control device 60 and thus the delivery of the pump 1 can be increased by increasing the speed of the prime mover 2 to a maximum value. As a result of the location of the priority valves 6 and 18, the hydraulic work system 20 is supplied with hydraulic fluid after the steering system 8, the feeder 15 and before the traction drive system 16.

At the maximum speed of travel and with the simultaneous actuation, for example, of the lifting cylinder of the hydraulic work system 20, however, the delivery of the pump 1 is not sufficient to cover the demand for hydraulic fluid of the hydraulic work system 20 and of the traction drive system 16. The traction drive system 16 switches into a coasting status. After the parking brake device 40a, 40b and the steering system 8, hydraulic fluid is delivered into the feed line 11, as a result of which the suction side of the traction drive motors 17a, 17b is supplied with hydraulic fluid via the anti-cavitation valves of the feeder device 15. The remaining hydraulic fluid is delivered into the inlet line 19 of the hydraulic work system 20. Because there is no propulsion when the vehicle is coasting, the vehicle coasts down and reduces its speed of travel, as a result of which the remaining delivery for the hydraulic work system 20 increases. The vehicle thereby decreases the speed of travel until the required flow of hydraulic fluid is available to the hydraulic work system 20. This speed is retained as long as the hydraulic work system 20 is actuated. After the hydraulic work system 20 is no longer being actuated, the delivery flow from the pump is once again available to the traction drive system 16, as a result of which the vehicle is accelerated to the maximum speed.

If, in the event of the simultaneous actuation of the traction drive system 16, the hydraulic work system 20 and possibly also of the steering system 8, there is a reduction in the speed of the prime mover 2, the pump 1 is switched in the sense of a reduction in the delivery current, as a result of which, and on account of the location of the priority valves 6, 18, the delivery current flowing into the traction drive system 16 is reduced first. To prevent a reduction in the speed of the vehicle, the speed of the prime mover 2 can be increased to the maximum speed and thus the delivery of the pump 1 can be increased.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

I claim:

1. A hydrostatic drive system for an industrial truck, comprising:

a hydrostatic traction drive system;

a hydraulic work system;

a hydraulic steering system; and a single hydraulic pump with an adjustable delivery volume, wherein the traction drive system, the hydraulic work system and the steering system form an open circuit, wherein the hydraulic pump is in flow communication with the open circuit, and wherein a priority sequence of the hydraulic drive system is the steering system, then the hydraulic work system and then the traction drive system.

2. The hydrostatic drive system as claimed in claim 1, wherein the pump is connected to a delivery line in which there is at least one traction drive control valve, wherein upstream of the traction drive control valve in the delivery line of the pump there is a priority valve for the hydraulic work system, and wherein upstream of the priority valve of the hydraulic work system there is a priority valve for the steering system.

3. A hydrostatic drive system for a vehicle, comprising:

a hydrostatic traction drive system;

a hydraulic work system;

a hydraulic steering system; and a hydraulic pump with an adjustable delivery volume, wherein the traction drive system, the hydraulic work system and the steering system form an open circuit, wherein the hydraulic pump is in flow communication with the open circuit, wherein the pump is connected to a delivery line in which there is at least one traction drive control valve, wherein upstream of the traction drive control valve in the delivery line of the pump there is a priority valve for the hydraulic work system, wherein upstream of the priority valve of the hydraulic work system there is a priority valve for the steering system, wherein the system includes a feeder device for the traction drive system, and wherein a feed line of the feeder device is connected in the delivery line downstream of the priority valve of the hydraulic steering system and upstream of the priority valve of the hydraulic work system.

4. The hydrostatic drive system as claimed in claim 2, wherein the steering system is a load-sensing steering system and the priority valve of the steering system is movable in the direction of a first switching position connecting the delivery line with an inlet line of the steering system by a spring and a load pressure of the steering system, and is movable in the direction of a second switching position that connects the delivery line with the inlet line of the steering system and a delivery line portion leading to the priority valve of the hydraulic work system, by the pressure in the inlet line of the steering system.

5. The hydrostatic drive system as claimed in claim 2, wherein the priority valve for the hydraulic work system is movable in the direction of a first switching position that connects the delivery line with an inlet line of the hydraulic work system by a spring and a load pressure of the hydraulic work system, and is movable in the direction of a second switching position that connects the delivery line with the inlet line of the hydraulic work system and a delivery line portion leading to the traction drive control valve by the pressure in the inlet line of the hydraulic work system.

6. The hydrostatic drive system as claimed in claim 3, including a pressure reducing valve in the feed line of the feeder device.

7. The hydrostatic drive system as claimed in claim 6, wherein the feed line is connected upstream of a pressure reducing valve to a return line of the hydraulic steering system, and is connected to an outlet line leading to a reservoir.

8. The hydrostatic drive system as claimed in claim 2, wherein the traction drive control valve is a throttling, spring-centered, directional control valve with a closed middle position and open outer positions which have an inlet orifice and an outlet orifice, wherein the traction drive control valve is connected to the delivery line and an outlet line that is connected to a reservoir, and is also connected with delivery lines of the traction drive system and a load pressure signal line.

9. A hydrostatic drive system for a vehicle, comprising:
a hydrostatic traction drive system;
a hydraulic work system;
a hydraulic steering system; and
a hydraulic pump with an adjustable delivery volume, wherein the traction drive system, the hydraulic work system and the steering system form an open circuit, and wherein the hydraulic pump is in flow communication with the open circuit, wherein the pump is connected to a delivery line in which there is at least one traction drive control valve, wherein upstream of the traction drive control valve in the delivery line of the pump there is a priority valve for the hydraulic work system, and wherein upstream of the priority valve of the hydraulic work system there is a priority valve for the steering system, wherein the traction drive control valve is a throttling, spring-centered, directional control valve with a closed middle position and open outer positions which have an inlet orifice and an outlet orifice, wherein the traction drive control valve is connected to the delivery line and an outlet line that is connected to a reservoir, and is also connected with delivery lines of the traction drive system and a load pressure signal line,
wherein the system includes a flow regulator in the outlet line of the traction drive control valve, which flow regulator in a first switching position interrupts the connection between the outlet line of the traction drive control valve and the reservoir, and in a second switching position connects the outlet line with the reservoir, and wherein the flow regulator is pressurized in the direction of the first switching position by the pressure in the delivery lines of the traction drive system upstream of the traction drive control valve and is pressurized in the direction of the second switching position by the force of a spring and by the pressure in the outlet line downstream of the traction drive control valve.

10. The hydrostatic drive system as claimed in claim 9, wherein the traction drive control valve includes a spool valve and the flow regulator is integrated into the spool valve of the traction drive control valve.

11. The hydrostatic drive system as claimed in claim 8, wherein the inlet orifice and the outlet orifice of the traction drive control valve are substantially the same size.

12. The hydrostatic drive system as claimed in claim 8, including a precision control range on the traction drive control valve, wherein in response to a deflection of the traction drive control valve, the outlet orifice is smaller than the inlet orifice of the traction drive control valve.

13. The hydrostatic drive system as claimed in claim 8, wherein the outlet orifice is larger than the inlet orifice of the traction drive control valve in a region of the maximum deflection of the traction drive control valve.

14. The hydrostatic drive system as claimed in claim 3, wherein the traction drive control valve is hydraulically actuated and wherein a control pressure line is connected to the feed line and is in flow communication with the traction drive control valve.

15. The hydrostatic drive system as claimed in claim 14, including a control valve located in the control pressure line, which control valve is actuated by an actuator element and is connected to the traction drive control valve for feedback on the deflection of the traction drive control valve.

16. The hydrostatic drive system as claimed in claim 15, wherein the control valve has an outlet line with a flow control valve located in the outlet line of the control valve.

17. The hydrostatic drive system as claimed in claim 16, including a bypass valve to the flow control valve in flow communication with the outlet line of the control valve, wherein the bypass valve is pressurizable by the pressure in an outlet line of the traction drive control valve upstream of a flow regulator in the direction of a closed position and is pressurizable by the force of a spring in the direction of an open position.

18. The hydrostatic drive system as claimed in claim 15, wherein the traction drive control valve and the control valve are rotary spool valves.

19. The hydrostatic drive system as claimed in claim 2, wherein the traction drive system includes a parking brake device which has a parking brake valve and a brake line leading to the parking brake device, wherein the parking brake valve is actuated by an actuator element and the brake line is connected to the delivery line upstream of the priority valve for the steering system.

20. The hydrostatic drive system as claimed in claim 19, wherein the parking brake valve is a pressure reducing valve.

21. The hydrostatic drive system as claimed in claim 1, wherein the hydraulic work system includes a load pressure signal line having a pressure relief valve set to a maximum pressure of the hydraulic work system.

22. The hydrostatic drive system as claimed in claim 2, including a demand flow regulator connected to an adjustment device of the hydraulic pump and pressurizable by a load pressure downstream of the traction drive control valve in the direction of an increase in the delivery of the pump and pressurizable by the pressure in the delivery line upstream of the traction drive control valve in the direction of a reduction of the delivery of the pump.

23. The hydrostatic drive system as claimed in claim 1, wherein the steering system includes a load pressure signal line having a pressure reducing valve set to a maximum allowable pressure of the steering system.

24. The hydrostatic drive system as claimed in claim 1, including a prime mover connected to the hydraulic pump and an electronic control device connected to a speed control device of the prime mover, wherein the electronic control device actuates the speed control device as a function of the actuation of at least one of the traction drive system and the hydraulic work system.

25. The hydrostatic drive system as claimed in claim 24, wherein the hydraulic work system includes directional control valves having sensors that detect the deflection of the directional control valves to specify a setpoint for the electronic control device.

26. The hydrostatic drive system as claimed in claim 24, wherein the electronic control device has a reduction regulation system, including a sensor device that detects the actual speed of the prime mover.

27. The hydrostatic drive system as claimed in claim 2, including a valve connected to an adjustment device of the pump, wherein the valve is movable in the direction of a reduction of the output of the pump by the pressure in the delivery line and is movable in the direction of an increase of the output of the pump by the force of a spring, wherein the spring of the valve is set to the maximum operating pressure of the drive system.

28. The hydrostatic drive system as claimed in claim 27, including a demand flow regulator and an electronic control device, wherein at least one of the demand flow regulator and the valve is actuatable in the direction of a reduction in the delivery flow of the pump by the electronic control device.

29. The hydrostatic drive system as claimed in claim 28, wherein at least one of the demand flow regulator and the valve has a proportional magnet that is connected with the electronic control device.

30. The hydrostatic drive system as claimed in claim 24, wherein the traction drive system includes an actuator element and a sensor device and the electronic control device detects the deflection of the actuator element to specify a setpoint for the electronic control device.

* * * * *